(12) United States Patent
Teague et al.

(10) Patent No.: US 8,079,433 B2
(45) Date of Patent: Dec. 20, 2011

(54) RETRACTABLE LINE GUIDANCE FOR SELF-PROPELLED MACHINES

(75) Inventors: Ross Carlyle Teague, Cary, NC (US); Noel Wayne Anderson, Fargo, ND (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 12/706,155

(22) Filed: Feb. 16, 2010

(65) Prior Publication Data
US 2011/0198136 A1   Aug. 18, 2011

(51) Int. Cl.
B62B 3/00 (2006.01)
(52) U.S. Cl. ..................................................... 180/19.3
(58) Field of Classification Search ............... 180/19.1, 180/19.2, 19.3
See application file for complete search history.

(56) References Cited

U.S. PATENT DOCUMENTS

| | | | |
|---|---|---|---|
| 2,259,193 A | | 10/1941 | Andrew |
| 2,796,944 A | | 6/1957 | Clement, Jr. |
| 3,627,071 A | | 12/1971 | Haupt |
| 3,731,756 A | * | 5/1973 | Hajec ............................ 180/6.5 |
| 3,744,223 A | | 7/1973 | Jensen |
| 3,989,116 A | * | 11/1976 | Hirano .......................... 180/19.3 |
| 4,615,406 A | * | 10/1986 | Bottenschein et al. ...... 180/19.1 |
| 4,967,862 A | | 11/1990 | Pong et al. |
| 5,534,762 A | | 7/1996 | Kim |
| 5,621,291 A | | 4/1997 | Lee |
| 7,113,847 B2 | | 9/2006 | Chmura et al. |
| 7,255,192 B2 | | 8/2007 | Perrin et al. |
| 7,412,748 B2 | | 8/2008 | Lee et al. |
| 7,861,810 B2 | * | 1/2011 | Matsukuma ................. 180/19.3 |
| 2005/0279066 A1 | | 12/2005 | Osborne |

FOREIGN PATENT DOCUMENTS

WO   WO 2009050986 A1 *   4/2009

OTHER PUBLICATIONS

U.S. Appl. No. 12/706,173, filed Feb. 16, 2010, Thompson et al.
"Autonomous Solutions Inc. enters mining industry", Oct. 21, 2008, Autonomous Solutions News, pp. 1 http://autonomoussolutions.com/news/news.php.
European Search Report, Apr. 27, 2011, 6 Pages.

* cited by examiner

*Primary Examiner* — Kevin Hurley
(74) *Attorney, Agent, or Firm* — Yee & Associates, P.C.; Dawn C. Wolff (57) ABSTRACT

Retractable line guidance for a self-propelled machine, such as a self-propelled lawn mower, is provided by an operator moving a string or line to control the speed and direction of movement of the machine. A retractable and extendable line is mounted on the machine and is under tension in a retraction direction when the line is extended. A length of extension of the line is monitored, and a speed of movement of the machine is controlled in response to the length of extension of the line to maintain the length of extension of the line at a selected length. An angle of the line with respect to the machine is monitored, and a direction of movement of the machine is controlled in response to the angle of the line to maintain the angle of the line at a selected angle.

26 Claims, 5 Drawing Sheets

RETRACTABLE LINE GUIDANCE FOR SELF-PROPELLED MACHINES

FIELD OF THE INVENTION

The present invention relates generally to self-propelled machines and, more particularly, to systems and methods for guiding self-propelled machines such as systems and methods for controlling the speed and direction of movement of self-propelled machines.

BACKGROUND OF THE INVENTION

Self-propelled machines are characterized generally as machines that include an on-board machine source of motive power and a mechanism coupled to the source of power for propelling the machine through and/or across a medium. For example, self-propelled machines may employ various different forms of machine power and appropriate mechanisms for propelling the machine across land, through the air, through or on top of the water, or even in outer space.

The movement of a self-propelled machine is controlled or guided by a guidance system that includes an operator and a guidance control system. The operator determines the guidance to be provided to the self-propelled machine. The guidance control system implements the guidance determined by the operator to guide the self-propelled machine by controlling, for example, the speed and direction of movement of the machine. The operator may be, in many cases, a human operator. A human operator may provide guidance to the guidance control system either directly, such as using a direct mechanical and/or electromechanical human interface to the guidance control system, or remotely, using a system to transmit guidance commands from a remote location to the guidance control system. In other cases, the operator may be a machine, such as an on-board or remote computer. In this latter case the self-propelled machine may be operated as an autonomous robot.

Examples of self-propelled machines include various self-propelled machines that are used by individual operators to perform yard work and the like. Self-propelled lawn mowers and snow throwers are examples of such machines. These machines typically include a motor, such as an electric motor or gasoline or diesel engine, which is used to drive wheels that propel the machine across the ground. The same motor that powers the drive wheels typically also is used to power a task payload of the machine. For example, the task payload of a self-propelled lawn mower may include a mower blade driven by the machine motor. The task payload of a snow thrower may include an auger and impeller driven by the machine motor.

The operator of a typical self-propelled lawn mower or snow throwers is a human person who walks behind the self-propelled machine to guide it. In the most basic scenario, the guidance system for such a machine includes a lever or some other mechanism for controlling the speed of the machine and a handle for directing the machine in the desired direction. The speed control mechanism may provide for the operator to select from between just two speeds, forward and stopped, or may allow the operator to stop and start motion of the machine and to select from among multiple forward and reverse speeds. The operator may guide the direction of movement of the machine by pushing and pulling on the handle to force the machine to move in the desired direction.

Some self-propelled lawn mowers and snow throwers provide a mechanism to assist the walk behind human operator of the machine to turn the machine in a desired direction. For example, such a mechanism may include levers on the right and left sides of the machine handle that are actuated by the human operator. These levers are coupled to the wheel drive mechanisms of wheels on the right and left sides of the machine, respectively, such that drive power to the corresponding wheels is removed when the corresponding lever is actuated. Thus, for example, to turn the machine to the right, with the machine moving forward, the operator can actuate the lever on the right side of the machine handle. This will remove drive power to the right side drive wheel of the machine, causing it to stop. The left side drive wheel is still being driven, however, moving the left side of the machine forward, thereby turning the machine to the right as long as the right lever is actuated. The machine may be turned to the left by actuating the left side lever in a similar manner. If both levers are actuated simultaneously, drive power is removed from both the right and left side drive wheels, thereby bringing the machine to a stop.

SUMMARY

A self-propelled machine featuring retractable line guidance is disclosed. A self-propelled machine in accordance with an illustrative embodiment includes a body, movable ground engaging structures, such as wheels, tracks, or legs, attached to the body, and a motor mounted on the body and coupled to the movable ground engaging structures to move the ground engaging structures to propel the machine across the ground. A speed control mechanism controls the speed of movement of the machine and a direction control mechanism controls a direction of movement of the machine. A retractable and extendable line is mounted on the body. The line is under tension in a retraction direction when the line is extended. A line extension monitoring device monitors a length of extension of the line. A speed controller is connected to the line extension monitoring device and to the speed control mechanism and controls the speed of movement of the self-propelled machine in response to the length of extension of the line to maintain the length of extension of the line at a selected length. A line angle monitoring device monitors an angle of the line with respect to the body. A direction controller is connected to the line angle monitoring device and to the direction control mechanism and controls the direction of movement of the self-propelled machine in response to the angle of the line to maintain the angle of the line at a selected angle.

A method for guiding a self-propelled machine using retractable line guidance also is disclosed. In accordance with an illustrative embodiment, a retractable and extendable line is mounted on the self-propelled machine. The line is under tension in a retraction direction when the line is extended. A length of extension of the line is monitored, and a speed of movement of the machine is controlled in response to the length of extension of the line to maintain the length of extension of the line at a selected length. An angle of the line with respect to the machine is monitored, and a direction of movement of the machine is controlled in response to the angle of the line to maintain the angle of the line at a selected angle.

A retractable line guidance system for a self-propelled machine also is disclosed. In accordance with an illustrative embodiment, a retractable line guidance system includes a retractable and extendable line, a tensioning mechanism configured to maintain the line under tension in a retraction direction when the line is extended, a line extension monitoring device configured to monitor a length of extension of the line, a line angle monitoring device configured to monitor an angle of the line, and a controller. The controller is connected to the line extension monitoring device and to the line angle monitoring device. The controller generates speed control signals to control the speed of movement of the self-propelled machine in response to the length of extension of the line to maintain the length of extension of the line at a selected length. The controller generates direction control signals to control a direction of movement of the self-propelled machine in response to the angle of the line to maintain the angle of the line at a selected angle.

Various features, functions, and advantages can be achieved independently in various embodiments or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and advantages thereof, will best be understood by reference to the following detailed description of illustrative embodiments of the present invention when read in conjunction with the accompanying drawings, wherein:

DESCRIPTION OF THE PREFERRED EMBODIMENT

An effective, easy to use, and low cost system and method for guiding a self-propelled machine is disclosed. Illustrative embodiments will be presented herein with reference to self-propelled machines that are operated by walk-behind human operators to perform various yard care related tasks. However, illustrative embodiments are not limited to the applications described by example herein. A retractable line guidance system and method in accordance with an illustrative embodiment may be used in a variety of applications to guide self-propelled machines of any size that are used for any purpose. For example, a retractable line guidance system and method in accordance with an illustrative embodiment may be used to guide self-propelled machines of a variety of different types and for a variety of different applications, including self-propelled toys, self-propelled machines used for military, law enforcement, and civilian applications, and large or small self-propelled equipment used in research, education, hauling, demolition, construction, manufacturing, farming, forestry, and mining operations and the like.

The illustrative embodiments presented herein recognize and take into account a number of different considerations. For example, the different illustrative embodiments recognize and take into account that conventional walk behind self-propelled yard work machines, such as self-propelled lawn mowers and snow throwers, often are difficult to maneuver. A self-propelled walk behind lawn mower typically requires a larger engine, since the motor is required to drive the mower wheels as well as the mower blade, along with additional equipment for delivering engine power to the drive wheels, thereby making the self-propelled mower much heavier than a comparable push power mower. Thus, ironically, a self-propelled walk behind mower is often more difficult to maneuver by an operator than a comparable push power mower. For a yard with many obstacles, such as trees, playground equipment, and the like, to mow around, this lack of maneuverability can reduce significantly the human effort savings otherwise afforded by the self-propelled mower.

The different illustrative embodiments also recognize and take into account that the effort required to guide many conventional self-propelled yard work machines prevents them from being used by certain individuals, such as the elderly, who lack the strength and/or endurance required to force continually the machine to move in a desired direction. Many of these individuals would enjoy doing yard work, and/or would benefit from being outside and getting moderate exercise by walking behind a self-propelled yard work machine, if a low-effort and easy to use system and method for guiding such a machine were provided.

Figure 1:
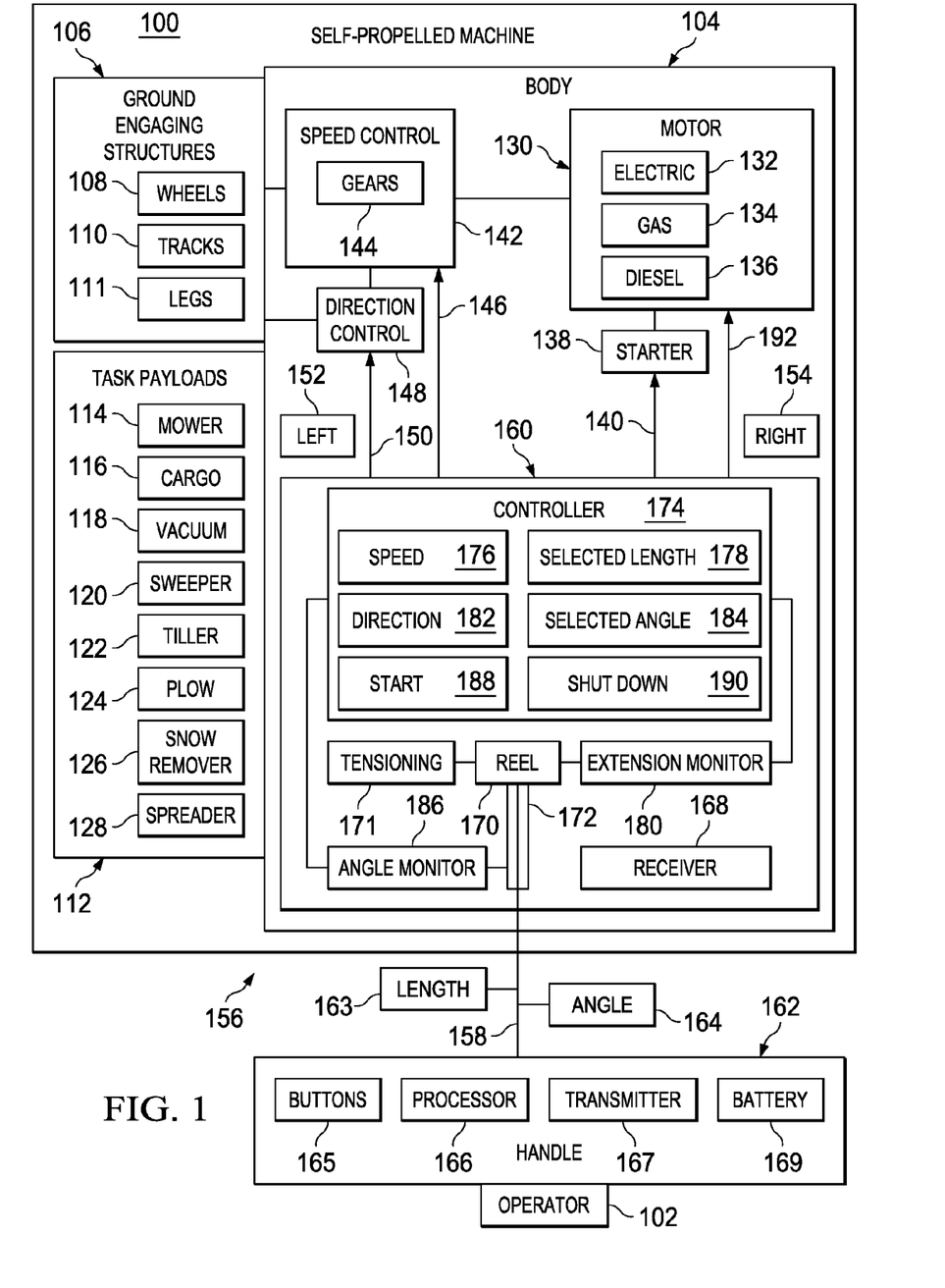
FIG. 1 is a block diagram of functional components of a self-propelled machine in which retractable line guidance in accordance with an illustrative embodiment is implemented.

Structural and functional components of self-propelled machine 100 incorporating retractable line guidance in accordance with an illustrative embodiment are illustrated in block diagram form in FIG. 1. In this example, self-propelled machine 100 may be a self-propelled machine used for yard work or some other purpose and that is guided by operator 102. Operator 102 may be, for example, a walk-behind human operator or a machine operator, such as, for example, a robot, that generally follows self-propelled machine 100 and thus guides self propelled machine 100 from a position generally behind the machine 100 or from a side of the machine 100 opposite to the general direction of forward motion of the machine 100.

Self-propelled machine 100 includes machine body 104. Movable ground engaging structures 106 are attached to body 104. Examples of moveable ground engaging structures 106 include conventional wheels 108, continuous and/or segmented tracks 110, and legs 111. Any desired number of moveable ground engaging structures 106 of any desired type, or multiple types, may be employed to support body 104, depending, for example, on the size, weight, operating environment, and/or application of self-propelled machine 100.

One or more task payloads 112 also may be provided attached to body 104. Task payloads 112 define one or more task functions of self-propelled machine 100. For example, in the context of yard work and related functions, task payloads 112 may include one or more of mower payload 114, such as mower blades, cargo payload 116, such as a bin, bed, bucket, or other container or structure for containing or supporting materials of any type to be transported by machine 100, vacuum payload 118, such as a vacuum for collecting leaves or other yard debris, sweeper payload 120, such as a rotating sweeper for collecting debris or brushing away debris or snow, etc., tiller payload 122, such as including rotating tiller blades, plow payload 124, such as for plowing snow or soil, snow remover payload 126, such as including an auger and impeller, and spreader payload 128, such as for spreading seed, chemicals such as fertilizer, or the like.

A self-propelled machine in accordance with an illustrative embodiment may include other and/or different task payloads from those disclosed by example herein. Furthermore, self-propelled machine 100 in accordance with an illustrative embodiment may include multiple different task payloads 112 in desired combinations. For example, a self-propelled spreader in accordance with an illustrative embodiment may include spreader payload 128 for spreading fertilizer or seed and cargo payload 116 for containing the fertilizer or seed to be spread by spreader payload 128. A self-propelled lawn mower in accordance with an illustrative embodiment may include mower payload 114, for cutting grass, vacuum payload 118, for collecting cut grass clippings, and cargo payload 116, for transporting the collected grass clippings for disposal.

Motor 130 mounted on body 104 is coupled to movable ground engaging structures 106 to impart motion to movable ground engaging structures 106, thereby to propel self-propelled machine 100 across the ground. Motor 130 may be coupled to impart motion to one, some, or all of ground engaging structures 106. Motor 130 also may be coupled to one or more task payloads 112 to power such payloads 112 as needed or desired. Motor 130 may include any type of machine used to provide mechanical motion. Motor 130 may include, for example, electric motor 132, gasoline engine 134, or diesel engine 136, or hybrid versions thereof. Motor 130 may comprise one or more conventional individual motors and/or engines of different or the same types. The number, size, and types of machines used to implement motor 130 will depend upon such factors as the size, weight, operating environment, and functionality, including task payloads 112 driven by motor 130, of self-propelled machine 100.

Motor 130 may include starter 138 for starting operation of motor 130. Starter 138 preferably operates in a conventional manner to start operation of motor 130 in response, for example, to start motor signal 140. Starter 138 may be implemented as part of or separate from and coupled to motor 130. The need for and implementation of starter 138 will depend upon the type and implementation of motor 130. For example, starter 138 may include a conventional electric starter for gas engine 134 or diesel engine 136.

Motor 130 preferably is coupled to one or more movable ground engaging structures 106 via speed control mechanism 142. For example, speed control mechanism 142 may include one or more sets of gears 144 for coupling mechanical motion from motor 130 to one or more movable ground engaging structures 106. By engaging and disengaging gears 144 in a known manner, the speed at which movable ground engaging structures 106 are moved by motor 130, and thus the speed of self-propelled machine 100, may be adjusted. In a most basic implementation, speed control 142 may provide for just two speeds, stopped and forward. For example, when self-propelled machine 100 is stopped, speed control 142 may disengage gears 144 transmitting motion from motor 130 to movable ground engaging structures 106. Speed control 142 also may provide for a plurality of forward or forward and reverse movement speeds. This may be achieved, for example, by engaging different sets of gears 144 to achieve different speeds in a conventional manner. Different individual ones and/or sub-sets of movable ground engaging structures 106 may be provided with separately adjustable speed control mechanisms 142, such that different individual ones and/or subsets of moveable ground engaging structures 106 may be operated simultaneously at different speeds. As another alternative, speed control mechanism 142 may be implemented as one or more variable speed electric drives, thereby integrating the functions of speed control 142 and motor 130 in a known manner.

In accordance with an illustrative embodiment, speed control mechanism 142 preferably is configured to control the speed of movement of self-propelled machine 104 in response to one or more speed control signals 146. For example, speed control mechanism 142 may include solenoids or other electro-mechanical devices operable in response to speed control signals 146 to adjust the speed of self-propelled machine 100 by, for example, changing the engagement of selected gears 144 in response to speed control signals 146.

Direction control mechanism 148 provided on body 104 is configured in accordance with an illustrative embodiment to change a direction of movement of self-propelled machine 100 in response to one or more direction control signals 150. Direction control mechanism 148 may include, for example, one or more moveable ground engaging structures 106 that are moveable in a manner so as to alter the direction of movement of self-propelled machine 100. For example, direction control mechanism 148 may include one or more wheels 108 that are moveable by direction control mechanism 148, using, for example, a solenoid or appropriate stepper or other motor, so as to change an angle of the axis of rotation of such wheels 108 with respect to body 104, thereby to steer the direction of movement of self-propelled machine 104 in a conventional manner. Alternatively, direction control mechanism 148 may be implemented as part of or as an additional function to speed control mechanism 142. In this case, direction control mechanism 148 may employ speed control mechanism 142 as described above, for example, to impart different drive speeds simultaneously to moveable ground engaging structures on left 152 and right 154 sides of body 104, thereby changing the direction of movement of self-propelled machine 100 in a known manner.

In accordance with an illustrative embodiment, guidance of self-propelled machine 100 is provided by operator 102 using retractable line guidance system 156. Retractable line guidance system 156 includes retractable line 158 which preferably is extended by operator 102 from guidance system housing 160 mounted on body 104. Line 158 is flexible and may be formed as a monofilament line made, for example, from a synthetic material. Alternatively, line 158 may be formed from any type of line, cord, rope, string, wire, cable, or the like that is made from a single filament or multiple filaments of synthetic or natural materials, or a combination thereof. Preferably, line 158 is selected to be wear resistant, thereby to provide a long life for line 158 as it is extended from and retracted into housing 160 many times during the useful life of self-propelled machine 104. Preferably, line 158 is selected to be resistant to tangling, to prevent tangling of line 158 as line 158 is extended from and retracted into housing 160. Preferably, line 158 also is selected to be resistant to stretching.

Handle 162 preferably is provided connected at or near the distal end of line 158. Handle 162 may be implemented as any mechanical structure for coupling the distal end of line 158 to operator 102. For example, for human operator 102, handle 162 preferably is sized, shaped, and made of an appropriate material such that operator 102 may easily hold handle 162 in one hand in order to pull line 158 to extend it from housing 160, thereby to control length 163 of line 158, and to manipulate line 158, thereby to vary angle 164 of line 158 with respect to body 104 of machine 100. As will be discussed in more detail below, retractable line guidance system 156 enables operator 102 to guide self-propelled machine 100 by adjusting length 163 by which line 158 is extended from housing 160 and angle 164 of line 158 with respect to body 104 of machine 100. Handle 162 also operates to prevent the distal end of line 158 from being retracted entirely into housing 160.

Handle 162 may also include one or more buttons 165. Buttons 165 may be implemented using any button technology, such as pressing contacts together, pressure sensing, capacitive sensing, etc. Handle processor 166 in handle 162 detects when buttons 165 are actuated, and sends a signal related to the button activation via transmitter 167, such as a low power radio frequency transmitter, to receiver 168 on self-propelled machine 100. Processor 166 and transmitter 167 may be implemented in a conventional manner using low powered circuit components that may be powered by a replaceable or chargeable battery 169 in handle 162. As will be described in more detail below, buttons 165 may be used for a variety of operator control functions.

Line 158 preferably is wound around reel 170 or spool located in housing 160. Tensioning mechanism 171 coupled to reel 170 preferably applies winding force to reel 170, thereby to maintain tension on line 158 as it is extended from housing 160. In other words, tensioning mechanism 171 causes line 158 to be retracted automatically, by winding about reel 170, thereby pulling the distal end of line 158 toward housing 160, in the absence of any force applied to handle 162, such as by operator 102, to extend line 158 from housing 160. As will be discussed in more detail below, tensioning mechanism 171 may be implemented as a purely mechanical and/or electro-mechanical device. Line 158 preferably is directed from reel 168 out of housing 160 by arm 172. Arm 172 supports line 158 as line 158 is directed or fed out from housing 160 and will be described in more detail below.

Retractable line guidance system 156 includes controller 174, located in housing 160. In accordance with an illustrative embodiment, controller 174 implements guidance of self-propelled machine 100 based on length 163 and angle 164 of line 158 as imparted to line 158 by operator 102.

As will be discussed in more detail below, controller 174 controls speed 176 of self-propelled machine 100, by providing speed control signals 146 to speed control mechanism 142, in a manner so as to maintain length 163 of line 158 at selected length 178. To perform speed control function 176, controller 174 monitors length 163 of line 158, using a line extension monitoring device 180, and compares monitored length 163 of line 158 to selected length 178. As will be discussed in more detail below, line extension monitoring device 180 may be provided adjacent to reel 170 in housing 160 and may determine extended length 163 of line 158 by monitoring rotation of reel 170 around which line 158 is wound.

In accordance with an illustrative embodiment, controller 174 controls direction 182 of movement of self-propelled machine 100, by providing direction control signals 150 to direction control mechanism 148, in a manner so as to maintain angle 164 of line 158 at selected angle 184. To perform direction control function 182, controller 174 monitors angle 164 of line 158 with respect to body 104, using line angle monitoring device 186, and compares monitored angle 164 of line 158 to selected angle 184. As will be discussed in more detail below, line angle monitoring device 186 may be provided adjacent to arm 172 in housing 160 and may determine angle 164 of line 158 by monitoring force applied to arm 172, or angular displacement of arm 172, by line 158 as angle 164 of line 158 in the horizontal plane with respect to body 104 is changed by operator 102.

In accordance with an illustrative embodiment, angle monitor 186 also may be used by controller 174 to determine angle 164 of line 158 in a vertical plane with respect to body 104. As will be discussed in more detail below, changes in angle 164 of line 158 in both the horizontal and vertical planes may be made by operator 102 in various combinations and interpreted by controller 174 to provide for additional operator control functions, such as operator control functions related to the start 188 and shut-down 190 of operation of self-propelled machine 100.

Extension monitor 180 and angle monitor 186 may be implemented to communicate with controller 174 via a wired or wireless connection. A control module including reel 170 with line 158, tensioning mechanism 171, arm 172, extension monitor 180, and angle monitor 186 may be provided as a removable module in a separate housing that may be mounted temporarily to body 104, such as magnetically, and that may employ wireless communication between extension monitor 180 and controller 174 and between angle monitor 186 and controller 174. In this manner, a single control module may be used to provide retractable line guidance for multiple self-propelled machines 100, by moving the module between machines as needed.

In accordance with an illustrative embodiment, controller 174 implements start 188 and shut-down 190 functions for self-propelled machine 100. Start 188 and shut-down 190 functions may be initiated based, for example, on extended length 163 of line 158, on actuation of one or more buttons 165 on handle 162, and/or on changes in angle 164 of line 158 in the horizontal and vertical planes. As part of start function 188, controller 174 may provide start signal 140 to starter 138 to start motor 130. As part of shut-down function 190, controller 174 may provide shut-down signal 192 to motor 130 to shut down operation of motor 130. Start 188 and shut-down 190 functions in accordance with an illustrative embodiment will be described in more detail below.

Controller 174 may be implemented in any manner appropriate for implementing speed control 176, direction control 182, start 188 and/or shut-down 190 functions of retractable line guidance system 156 in accordance with an illustrative embodiment. For example, controller 174 may be implemented using a microcontroller or another type of programmable device, using discrete logic circuit components, or using any appropriate combination of programmable devices and/or discrete circuit components. To the extent that programmable devices are used to implement controller 174, one or more functions of controller 174 may be implemented in software and/or firmware that is run on the programmable device and that is stored in memory in the programmable device and/or in a separate memory device coupled to the programmable device.

Power for the various electrical components of retractable line guidance system 156, including controller 174, may be provided, for example, by an appropriate rechargeable battery which may be used exclusively to power retractable line guidance system 156 or also to power other electrical systems of self-propelled machine 100. Preferably an appropriate generator and/or charger mechanism is provided to charge the battery, for example, while motor 130 is in operation or while other batteries that may be associated with machine 100 are being charged.

The illustration of FIG. 1 is not meant to imply physical or architectural limitations to the manner in which different advantageous embodiments may be implemented. Other components in addition and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

When it is stated herein that a structure is attached to body 104, such structure may be attached directly to body 104 or indirectly to body 104 via an intermediate structure.

As will be explained in more detail below, selected angle 184 is a concept used to explain directional control 182 of self-propelled machine 100 using retractable line guidance in accordance with an illustrative embodiment. Selected angle 184 may or may not correspond to an actual angle or other value to which monitored line angle 164 is compared to provide directional control 182.

Various functional components of self-propelled machine 100, such as motor 130, starter 138, speed control mechanism 142, and direction control mechanism 148, will include appropriate mechanical, electrical, and/or electro-mechanical devices and/or structures in appropriate combinations for converting control signals from controller 174, such as start signal 140, speed control signals 146, direction control signals 150, and shut-down signal 192, into the appropriate mechanical action in these components. The particular devices and/or structures to be employed will depend upon the implementation of the functional components for a particular self-propelled machine 100 or application thereof in accordance with an illustrative embodiment, and will be known to those having skill in the art.

Figure 2:
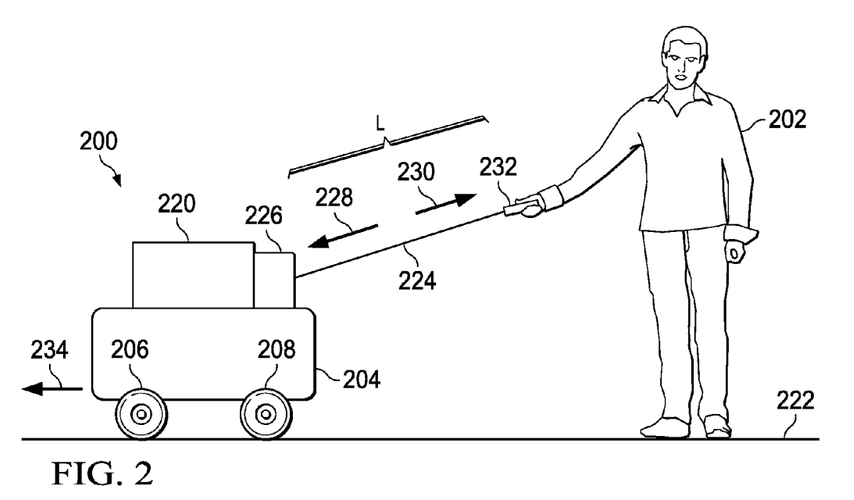
FIG. 2 is a side-view representational illustration of a self-propelled machine in operation using retractable line guidance in accordance with an illustrative embodiment.
Figure 3:
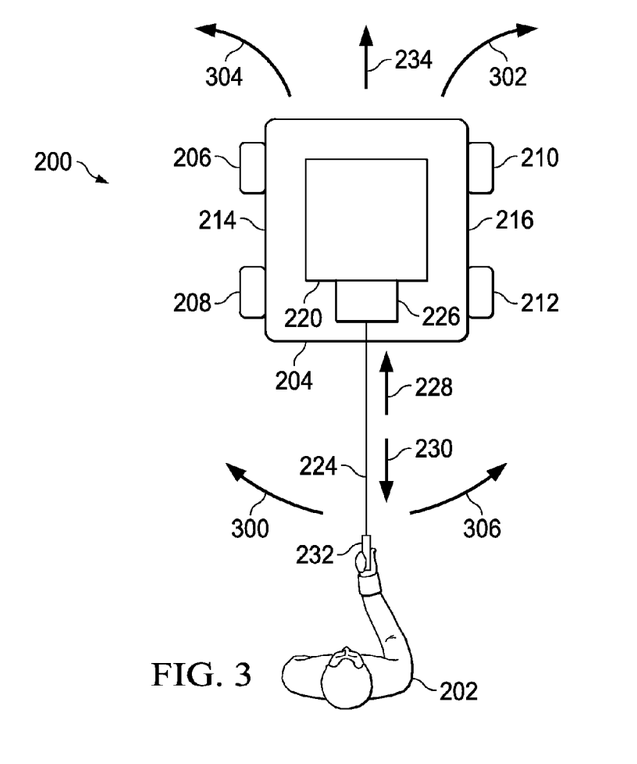
FIG. 3 is a top-view representational illustration of a self-propelled machine in operation using retractable line guidance in accordance with an illustrative embodiment.

Guidance of self-propelled machine 200 using retractable line guidance in accordance with an illustrative embodiment is described in more detail by example with reference to the side view and top view representational illustrations of FIG. 2 and FIG. 3, respectively. In this example, self-propelled machine 200 is an example of one implementation of self-propelled machine 100 in FIG. 1. For example, self-propelled machine 200 may be a self-propelled lawn mower or other self-propelled machine used for yard work and the like and that is guided by a walk behind operator 202. In this example, operator 202 is a human operator, and is one example of operator 102 in FIG. 1.

Self-propelled machine 200 includes body 204. Body 204 is an example of body 104 in FIG. 1. Body 204 is supported by four wheels 206, 208, 210, and 212. Wheels 206, 208, 210, and 212 are examples of moveable ground engaging structures 106 in FIG. 1. Wheels 206 and 208 are mounted on left side 214 of body 204, from the point of view of operator 202, and may be referred to as left-side wheels 206 and 208. Wheels 210 and 212 are mounted on right side 216 of body 204, from the point of view of operator 202, and may be referred to as right-side wheels 210 and 212. Wheels 206 and 210 may be referred to as front wheels 206 and 210. Wheels 208 and 212 may be referred to as rear wheels 208 and 212.

Motor 220 is mounted on body 204. Motor 220 is an example of one implementation of motor 130 in FIG. 1. Motor 220 is coupled to one or more of wheels 206, 208, 210, and/or 212 in a conventional manner so as to rotate one or more of wheels 206, 208, 210, and/or 212 under power to propel machine 200 across ground 222.

In accordance with an illustrative embodiment, line 224 is extended from housing 226 on body 204. Line 224 is an example of one implementation of line 158 of FIG. 1. As discussed above, line 224 is under tension. The force of this tension pulls line 224 in retraction direction 228, toward housing 226. During operation of machine 200, operator 202 pulls line 224 in the opposite extension direction 230, away from housing 226. Handle 232 attached at the distal end of line 224 facilitates operator 202 holding line 224 and overcoming the tension on line 224 to pull line 224 from housing 226 in the extension direction 230. At any point in time during operation of self-propelled machine 200, line 224 is extended a length L from housing 226 by operator 202, as illustrated in FIG. 2. The tension on line 224 keeps line 224 taut when line 224 is extended from housing 226 by operator 202.

In accordance with an illustrative embodiment, the speed of movement of self-propelled machine 200 is controlled in response to changes in extended length L of line 224 such that extended length L of line 224 is maintained approximately equal to a selected length. For example, consider the starting condition where machine 200 is not in motion, i.e., speed is zero, and extended length L of line 224 is approximately equal to the selected length. Operator 202 then moves forward, or moves the distal end of line 224 forward, toward machine 200, thereby causing the extended length L of line 224 under tension to shorten. In accordance with an illustrative embodiment, in order to maintain extended line length L approximately equal to the selected length, self-propelled machine 200 is controlled to move forward, in the direction indicated by arrow 234, thereby moving self-propelled machine 200 away from operator 202 and extending line 224 back to the selected length.

Operator 202 may now follow the moving machine 200, such as by walking behind machine 200, while keeping the extended length L of line 224 steady. In accordance with an illustrative embodiment, as long as the extended length L of line 224 is maintained approximately equal to the selected length, machine 200 will continue to move forward 234 at a steady speed.

If operator 202 now stops moving, or otherwise pulls line 224 in extension direction 230, with machine 200 moving forward 234, the extended length L of line 224 will extend beyond the selected length. In response, in accordance with an illustrative embodiment, self-propelled machine 200 is controlled to stop. Machine 200 will remain stopped until, for example, operator 202 moves forward again, or operator 202 moves the distal end of line 224 forward again, such that extended length L of line 224 is once again less than the selected length. At this point machine 200 will be controlled to move forward 234 once again.

The example just presented assumes a self-propelled machine 200 that may be controlled between only two speeds of movement, stopped and forward. In a general case, self-propelled machine 200 may be controlled to move forward 234 at one or more forward speeds, up to a maximum forward speed, to be stopped, and to be moved in reverse at zero or more reverse speeds, up to a maximum reverse speed. In accordance with an illustrative embodiment, in the generic case, the movement speed of machine 200 is controlled such that machine 200 is accelerated in forward direction 234, up to the maximum forward speed, when the extended length L of line 224 is less than approximately the selected length. Thus, for example, as operator 202 walking behind machine 200 begins to walk faster, the movement speed of machine 200 will continue to increase, up to the maximum speed, in order to maintain the extended length L of line 224 approximately equal to the selected length.

Similarly, in the generic case, the movement speed of machine 200 is controlled such that machine 200 is decelerated in forward direction 234, or accelerated in the reverse direction, up to the maximum reverse speed or stop, when the extended length L of line 224 is greater than approximately the selected length. Thus, for example, as operator 202 walking behind machine 200 begins to walk more slowly, and stops, the movement speed of machine 200 will be controlled to decrease, and then stop, in order to maintain the extended length L of line 224 approximately equal to the selected length. If operator 202 then moves backward, or pulls line 224 in extension direction 230, the movement speed of machine 200 may be controlled to move machine 200 in the reverse direction, toward operator 202, in order to maintain extended length L of line 224 approximately equal to the selected length.

In accordance with an illustrative embodiment, the direction of movement of self-propelled machine 200 is controlled in response to changes in an angle of line 224 as provided by operator 202. More specifically, in accordance with an illustrative embodiment, the direction of movement of self-propelled machine 200 is adjusted automatically in response to changes in the angle of line 224 in the horizontal plane such that the angle of line 224 with respect to body 204 of machine 200 is maintained approximately equal to a selected angle. For example, the selected angle with respect to body 204 of machine 200 may be defined as approximately zero degrees with respect to the direction of straight ahead forward movement of machine 200, i.e., the direction of movement of machine 200 when it is not turning. Thus, in accordance with an illustrative embodiment, the direction of movement of self-propelled machine 200 may be adjusted automatically so as to maintain line 224 at an angle in the horizontal plane that is in parallel with an axis along body 204 in the horizontal plane that is parallel with the direction of straight ahead forward movement of machine 200.

For example, with reference to FIG. 3, consider the case where self-propelled machine 200 is moving in forward direction 234 followed by operator 202 holding line 224 by handle 232. Operator 202 moves line 224 to the left, with respect to operator 202, in the direction indicated by arrow 300. In response, in accordance with an illustrative embodiment, machine 200 is controlled to turn right, with respect to operator 202, in the direction indicated by arrow 302, in order to align the direction of forward movement of machine 200 with line 224 in the horizontal plane. As the angle of line 224 with respect to body 204 is brought parallel with the axis direction of forward movement of body 204, machine 200 is controlled to stop turning and thus to continue moving straight ahead 234. Similarly, in order to turn self-propelled machine 200 to the left, indicated by arrow 304, when moving in forward direction 234, operator 202 moves line 224 to the right, indicated by arrow 306, with respect to the axis direction of straight ahead forward movement of body 204.

In accordance with an illustrative embodiment, the same process is used to control the direction of movement of self-propelled machine 200 when machine 200 is moving in the reverse direction. Thus, when machine 200 is moving in the reverse direction, the direction of movement of machine 200 is changed by changing the angle of line 224 in the horizontal plane with respect to body 204. As is the case when machine 200 is moving in the forward direction, the direction of movement of machine 200 in the reverse direction is controlled in response to a change in the angle of line 224 by turning machine 200 in a direction so as to align the direction of movement of machine 200, in this case in the reverse direction, with line 224 in the horizontal plane.

In accordance with an illustrative embodiment, the rate at which the direction of movement of self-propelled machine 200 is changed may be relative to the degree to which the angle of line 224 in the horizontal plane deviates from the direction of straight ahead movement axis of body 204. For example, if line 224 is moved to the left 300 by a relatively large angle, self-propelled machine 200 may be turned more quickly to the right 302 than if line 224 were moved by a smaller angle to the left 300. Thus, the direction of movement of machine 200 may be changed gradually by smaller movements of line 224 to the left 300 or right 306, whereas machine 200 may be turned more sharply by larger movements of line 224 to the left 300 or right 306.

Turning of self-propelled machine 200 in response to changing the angle of line 224 with respect to body 204 may be accomplished in a variety of ways. For example, one or more of wheels 206, 208, 210, and 212 may be turned, that is, the angle of the axis of rotation of one or more of wheels 206, 208, 210, and 212 with respect to body 204 may be changed, thereby to change the direction of movement of self-propelled machine 200. Alternatively, turning of machine 200 may be accomplished by adjusting the rotational speed of wheels 206, 208, 210, and 212 such that one or more wheels 206 and 208 on left side 214 of body 204 are rotated at a different speed and/or in a different direction from one or more wheels 210 and 212 on right side 216 of body 204.

Guidance of self-propelled machine 200 by operator 202 using retractable line guidance in accordance with an illustrative embodiment, as just described, results in controlled movement of machine 200 in response to movement of line 224 by operator 202 in a manner which corresponds to the controlled movement of a conventional walk-behind machine used for yard work, such as a lawn mower, by an operator using a handle of such a machine in a conventional manner. In both cases the machine moves forward as the line/handle is moved forward, moves in reverse as the line/handle is moved backwards, in the forward direction turns to the right or left as the line/handle is moved to the left or right, respectively, and stops when the operator stops moving. Thus, guidance of self-propelled machine 200 using retractable line guidance in accordance with an illustrative embodiment is intuitive and thus easy to learn and master. The movements required to guide machine 200 using line 224 will be familiar to many operators 202.

Figure 4:
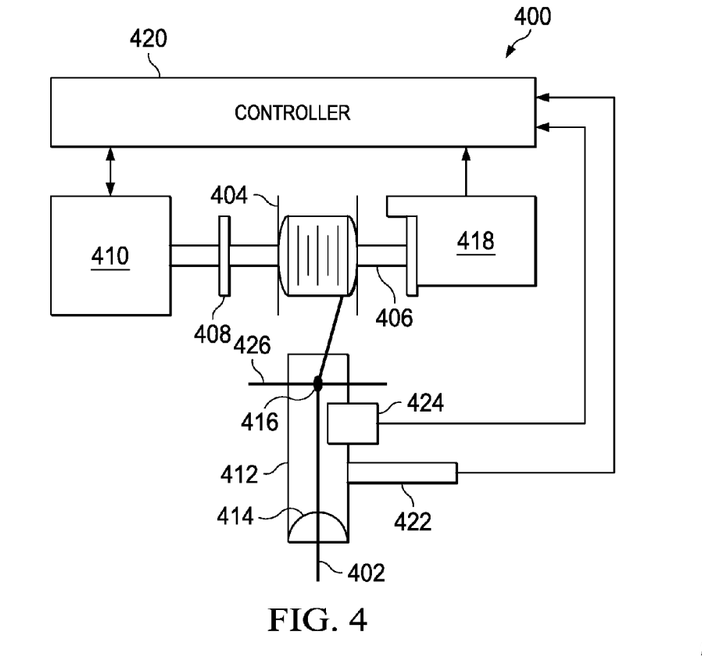
FIG. 4 is a representational illustration of a retractable line guidance system for a self-propelled machine in accordance with an illustrative embodiment.

A retractable line guidance system 400 for guiding a self-propelled machine in accordance with an illustrative embodiment is described in more detail with reference to FIG. 4. FIG. 4 shows representational components of retractable line guidance system 400. In this example, retractable line guidance system 400 is an example of retractable line guidance system 156 of FIG. 1. Components of retractable line guidance system 400 are illustrated in representational form in FIG. 4 in order to explain generically the functions performed by the components both individually and in relation to other components. Based on the description provided, a person of ordinary skill in the art will be able to select actual physical components that perform the functions described in order to assemble a retractable line guidance system as described and illustrated.

Retractable line guidance system 400 includes line 402. Line 402 is wound around reel 404. Reel 404 includes axle 406 or other structure by which reel 404 is supported on reel support structure 408. Reel 404 is mounted on support structure 408 such that reel 404 is rotatable about an axis thereof corresponding with axle 406. Reel 404, axle 406, and/or reel support structure 408 may thus include appropriate bearings and other structures to provide for rotation of reel 404 in a conventional manner. As line 402 is extended, reel 404 turns in one direction, as line 402 is unwound from reel 404. As line 402 is retracted, reel 404 turns in the opposite direction, as line 402 is wound around reel 404.

Tensioning mechanism 410 is coupled to reel 404 to bias reel 404 for rotation in the retraction direction of line 402. That is, tensioning mechanism 410 exerts a force on reel 404 so as to turn reel 404 in the direction to wind line 402 around reel 404 in the absence of any force pulling on line 402 to overcome the applied tension thereby to extend line 402 by unwinding line 402 from reel 404. Tensioning mechanism 410 thus also maintains line 402 taut as it is extended from reel 404. Tensioning mechanism 410 may be coupled to reel 404 via axle 406, or in any other appropriate manner depending upon the specific implementation of reel 404 and tensioning mechanism 410.

Tensioning mechanism 410 may be implemented as a purely mechanical mechanism, such as using a spring. Alternatively, tensioning mechanism 410 may be implemented as an electro-mechanical mechanism, such as using a DC or other motor coupled to reel 404 and operated to apply a desired torque to reel 404 in the direction to wind line 402 around reel 404. As another alternative, tensioning mechanism 410 may include a combination of mechanical and electro-mechanical structures, such as using a motor with a spring assist coupled to reel 404 to provide the desired degree of tension on line 402. Where tensioning mechanism 410 includes an electro-mechanical device, such as a motor, control and/or monitoring of tensioning mechanism 410 may be provided by controller 420 to control and/or monitor the degree of tension provided on line 402.

Arm 412 is provided to guide or feed line 402 from reel 404. Arm 412 is an elongated structure. Arm 412 may be implemented, for example, as a tube through which line 402 is run from reel 404. Alternatively, arm 412 may be implemented as a bar, rod, or other elongated structure having one or more eyelets or loops 414 or other structures attached thereto through which line 402 is run. Arm 412 preferably is rigid or semi-rigid, and may be made of any material and by any method appropriate for the desired form and degree of rigidity of arm 412. Arm 412 is secured to at least one mounting point 416. Arm 412 may be secured fixedly to mounting point 416 or may be secured for rotation about mounting point 416 with a biasing mechanism provided to bias arm 412 into a neutral rotational position.

In accordance with an illustrative embodiment, an extended length of line 402 may be determined using line extension monitoring device 418. For example, line extension monitoring device 418 may be mounted adjacent to reel 404 in order to monitor the extended length of line 402 by monitoring rotation of reel 404. Preferably, line extension monitoring device 418 may include a conventional rotary encoder, also called a shaft encoder, coupled to axle 406. A rotary encoder is an electro-mechanical device that converts the angular position of axle 406 to an analog or digital code, making it an angle transducer. This angular position information may be provided to controller 420. Controller 420 then determines the extended length of line 402 from the detected rotation of reel 404 as provided by line extension monitoring device 418.

Alternatively, other structures and/or devices may be used to implement line extension monitoring device 418. Line extension monitoring device 418 may, for example, include a magnetic field detector that detects the passing of magnets mounted on reel 404 as reel 404 is rotated. Alternatively, line extension monitoring device 418 may include an optical detection device that detects the passing of optically detectable markings provided on reel 404 as reel 404 is rotated. In either case, line extension monitoring device 418 may provide a count signal to controller 420 related to rotation of reel 404. Controller 420 may then determine the extended length of line 402 based on rotation of reel 404. Any other devices or methods currently known or which become known in the art may be used to implement line extension monitoring device 418 in accordance with an illustrative embodiment.

In accordance with an illustrative embodiment, an angle of line 402 may be monitored using an angle monitoring device 422. Angle monitoring device 422 may include a linear encoder that is coupled, for example, to arm 412. For example, angle monitoring device 422 may include a linear encoder that includes a pressure transducer that is coupled to arm 412. As line 402 is moved in the horizontal plane, arm 412 is displaced in the horizontal plane, either by bending arm 412 or rotating about point 416. The pressure transducer generates a signal that is relative to the degree of displacement. This signal is encoded by the linear encoder and provided to controller 420. Controller 420 then determines the angle of line 402 from the detected displacement of arm 412. Alternatively, an optical or mechanical sensor may be employed by the linear encoder to detect displacement of arm 412 in order to provide for determination of the angle of line 402 from the displacement of arm 412. As another alternative, angle monitoring device 422 may include a rotary encoder coupled to arm 412 at rotation point 416. In this case, the rotary encoder detects angular displacement of arm 412 by line 402 and provides a signal to controller 420 relative to a change in the angular position of arm 412 about an axis of rotation at point 416. Any other devices or methods currently known or which become known in the art may be employed in accordance with an illustrative embodiment to implement angle monitoring device 422.

Angle monitoring device 422 is used to determine an angle or displacement of line 402 in the horizontal plane. In accordance with an illustrative embodiment, an angle or displacement of line 402 in a vertical plane may be monitored using angle monitoring device 424. In this case, the vertical plane is defined as a plane extending perpendicularly through the page of FIG. 4. Movement of arm 412 in the vertical plane may be defined with respect to horizontal axis 426, for bending movement of arm 412 at horizontal axis 426. Alternatively, arm 412 may be secured for rotation about horizontal axis 426, with a biasing mechanism provide to bias arm 412 into a neutral vertical orientation.

Vertical angle monitoring device 424 may be implemented in a manner similar to, or different from, horizontal angle monitoring device 422. For example, angle monitoring device 424 may include a linear encoder that is coupled to arm 412. Angle monitoring device 424 may include a linear encoder that includes a pressure transducer that is coupled to arm 412. As line 402 is moved in the vertical plane, arm 412 is displaced in the vertical plane, either by bending arm 412 or rotating about axis 426. The pressure transducer generates a signal that is relative to the degree of displacement. This signal is encoded by the linear encoder and provided to controller 420. Controller 420 then determines the angle or displacement of line 402 in the vertical plane from the detected displacement of arm 412. Alternatively, an optical or mechanical sensor may be employed by the linear encoder to detect displacement of arm 412. As another alternative, angle monitoring device 424 may include a rotary encoder coupled to arm 412 at a rotation point corresponding to horizontal axis 426. In this case, the rotary encoder detects angular displacement of arm 412 by line 402 and provides a signal to controller 420 relative to a change in the angular position of arm 412 about axis 426. Any other devices or methods currently known or which become known in the art may be employed in accordance with an illustrative embodiment to implement angle monitoring device 424.

As discussed above, controller 420 may be implemented using a programmable device and/or discrete logic components in any desired combination to implement the functions of retractable line guidance in accordance with an illustrative embodiment. Using line extension monitoring provided by line extension monitoring device 418, controller 420 determines a difference between the determined extended line length and a selected length. Based on this difference, controller 420 generates speed control signals that are provided to a speed control mechanism to control the speed of movement of a self-propelled machine in a manner so as to eliminate the difference between the determined line length and the selected length. Using line angle monitoring provided by angle monitoring device 422, controller 420 determines a difference between the determined angle of line 402 in the horizontal plane and a selected angle. Based on this difference, controller 420 generates direction control signals that are provided to a direction control mechanism to control the direction of movement of the self-propelled machine in a manner so as to eliminate the difference between the determined line angle and the selected angle. Using line angle monitoring provided by angle monitoring devices 422 and 424, controller 420 detects displacements of line 402 in both the horizontal and vertical planes. In accordance with an illustrative embodiment, such displacements detected in certain combinations may be used to provide control instructions to controller 420, such as control instructions related to the start-up and shut-down of the self-propelled machine.

Figure 5:
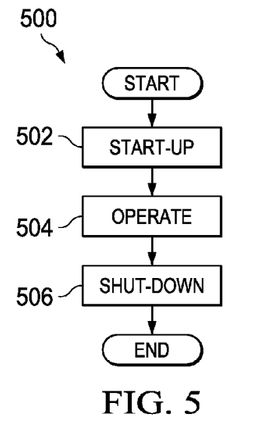
FIG. 5 is a flowchart of a method of using a self-propelled machine using retractable line guidance in accordance with an illustrative embodiment.

A general method 500 for using a self-propelled machine with retractable line guidance in accordance with an illustrative embodiment is presented in the flowchart diagram of FIG. 5. Use of a self-propelled machine with retractable line guidance in accordance with an illustrative embodiment begins with starting up the machine (step 502). As will be discussed in more detail below, step 502 may include using a retractable line guidance system in accordance with an illustrative embodiment to start up the motor of a self-propelled machine. Step 502 also may include establishing a selected length reference for use by a retractable line guidance system in accordance with an illustrative embodiment and engaging the retractable line guidance system for use in controlling the direction and speed of movement of the machine. After starting the machine, retractable line guidance in accordance with an illustrative embodiment is used to operate the machine (step 504). As will be discussed in more detail below, step 504 may include controlling the speed and direction of movement of a self-propelled machine using retractable line guidance in accordance with an illustrative embodiment. Finally, retractable line guidance in accordance with an illustrative embodiment may be used to shut-down a self propelled machine (step 506). As will be discussed in more detail below, step 506 may include using retractable line guidance in accordance with an illustrative embodiment to shut down a self-propelled machine intentionally or as a safety measure.

Figure 6:
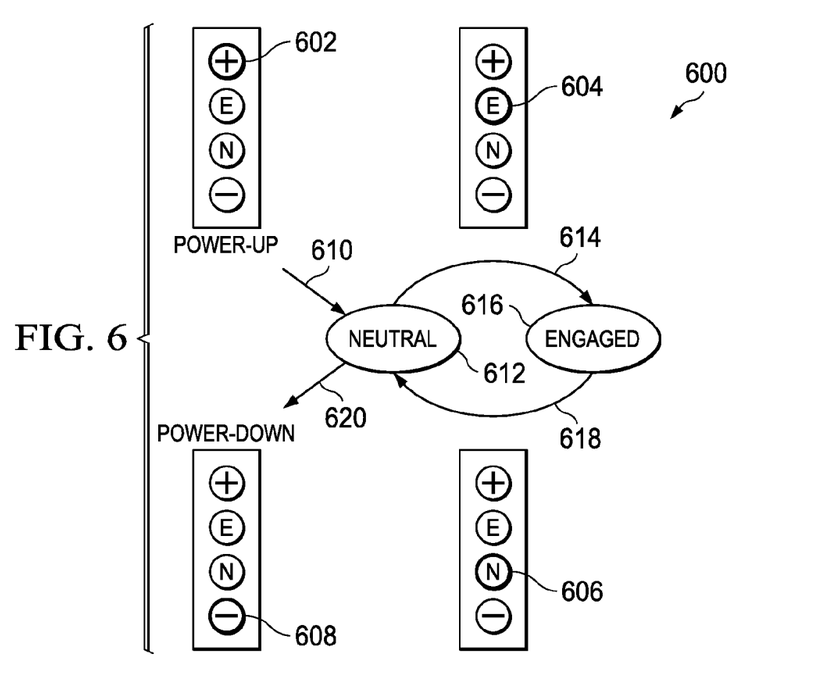
FIG. 6 is a state diagram of a start-up and controlled shut-down method using button controls for a self-propelled machine using retractable line guidance in accordance with an illustrative embodiment.
Figure 7:
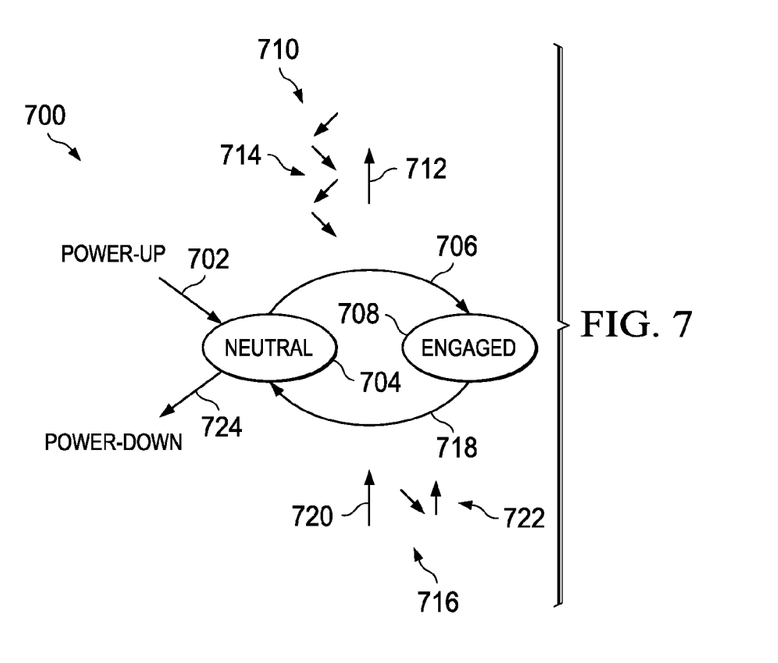
FIG. 7 is a state diagram of a start-up and controlled shut-down method using line movement controls for a self-propelled machine using retractable line guidance in accordance with an illustrative embodiment.

Start-up and controlled shut-down procedures for a self-propelled machine using retractable line guidance in accordance with an illustrative embodiment are described with reference to the state diagrams of FIG. 6 and FIG. 7. The processes illustrated in FIG. 6 and FIG. 7 will be described with reference also to FIG. 2 and FIG. 3.

As an initial condition, self-propelled machine 200 may be stopped with motor 220 off and line 224 entirely retracted into housing 226, except for handle 232, by the action of a line tensioning mechanism as described above. The retractable line guidance system in accordance with an illustrative embodiment may be turned off. In this case, operator 202 may first turn on the retractable line guidance system, such as by operation of an appropriate switch, before beginning the start-up procedure. Alternatively, the retractable line guidance system may be turned on but in a state of reduced activity and thus of reduced energy consumption. In this state, for example, the retractable line guidance system may check only for a power-up instruction, as will be described in more detail below. In response to detecting a power-up instruction, retractable line guidance system in accordance with an illustrative embodiment may turn itself on fully such that operation of all system functions is enabled.

A start-up and controlled shut-down procedure 600 for a self-propelled machine using retractable line guidance in accordance with an illustrative embodiment is described with reference to the state diagram of FIG. 6. In this example, start-up and shut-down of machine 200 is controlled by the use of control buttons that may be provided on string handle 232, as described previously. In this example, at least four control buttons may be provided on handle, power-up button 602, engage button 604, neutral button 606, and power-down button 608. Alternatively, the functions provided by multiple separate buttons as illustrated in FIG. 6 may be provided by a single button in some cases. For example, power-up 602 and power-down 608 buttons may be replaced by a single button that initiates a power-up function when actuated a first time and that initiates a power-down function when actuated a second time. Similarly, engage 604 and neutral 606 buttons may be replaced by a single button that initiates an engage function when actuated a first time and that initiates a neutral function when actuated a second time.

To begin use of a self-propelled machine using retractable line guidance in accordance with an illustrative embodiment, operator 202 grasps line 224 by handle 232 and extends line 224 from housing 226 to a comfortable extension length. Operator 202 then actuates control button 602 to generate a power-up instruction. In response to actuation of button 602, the retractable line guidance system is turned on fully, if it is not turned on already, and motor 220 is started. Power-up 610 of the machine 200 in response to actuation of button 602 may include sending a start signal to a starter to start motor 220.

Upon power-up 610 of machine 200, retractable line guidance system is in neutral state 612. In neutral state 612, control of the movement of machine 200 by movement of line 224 is disabled. Therefore, when in neutral state 612, power is not provided to drive wheels 206, 208, 210, and 212, machine 200 is not in motion, and movements of line 224 by operator 202 will have no effect on the movement of machine 200.

Operator 202 actuates control button 604 to engage the retractable line guidance system. Thus, in response to actuation of button 604, the retractable line guidance system transitions 614 from neutral state 612 to engaged state 616. In engaged state 616, the retractable line guidance system is used to control the movement of machine 200 in the manner described herein. Thus, when in engaged state 616, movements of line 224 by operator 202 are used to control the direction and speed of movement of machine 200.

As has been discussed, the speed of movement of self-propelled machine 200 is adjusted by a retractable line guidance system in accordance with an illustrative embodiment based upon a determined difference between a monitored extended length of line 224 and a selected length. The selected length may be a set length that may not be adjustable by operator 202. Preferably, however, the selected length is established automatically each time machine 200 is used. In this manner the selected length is adapted automatically for different operators 202 and/or different operating conditions such that a selected length that is most comfortable for operator 202 is established each time machine 200 is used. In accordance with an illustrative embodiment, the selected length may be established by operator 202 as the current extended length of line 224 at the time button 604 is actuated to enter engaged state 616.

As has been discussed, the direction of movement of self-propelled machine 200 is adjusted by a retractable line guidance system in accordance with an illustrative embodiment based upon a determined difference between a monitored angle of line 224 and a selected angle. As discussed above, the selected angle preferably may be set at zero with respect to a line parallel with the normal direction of straight ahead forward movement of self-propelled machine 200. Alternatively, the selected angle may be established automatically by an operator using a process similar to the process just described for establishing the selected length. This may provide a useful benefit for some operators. For example, some operators may prefer to guide self-propelled machine 200 from a position behind and to either the left 214 or right 216 side of machine 200, rather than from a position directly behind machine 200. By allowing the selected angle to be established by operator 202, such preferences may be accommodated by a retractable line guidance system in accordance with an illustrative embodiment. In accordance with an illustrative embodiment, the selected angle may be established by operator 202 as the current angle of line 224 at the time button 604 is actuated to enter engaged state 616.

Operator 202 may return the retractable line guidance system to neutral state 612 from engaged state 616 at any time by actuating control button 606. Thus, in response to actuation of button 606, the retractable line guidance system transitions 618 from engaged state 616 back to neutral state 612.

From neutral state 612, machine 200 may be shut down by operator 202 by actuation of control button 608. In response to actuation of control button 608, machine 200 may be powered down 620 by turning off motor 220 and turning off the retractable line guidance system or returning the retractable line guidance system to a state of reduced activity and energy consumption, as described above. Line 224 may then be released by operator 202, and will be automatically retracted into housing 226 by operation of the tensioning mechanism described earlier.

Another start-up and controlled shut down procedure 700 for a self-propelled machine using retractable line guidance in accordance with an illustrative embodiment is described with reference to the state diagram of FIG. 7. In this example, start-up and controlled shut-down of machine 200 is controlled exclusively by movement of line 224 by operator 202.

To begin use of self propelled machine 200 using retractable line guidance in accordance with an illustrative embodiment, operator 202 grasps line 224 by handle 232 and extends line 224 from housing 226. As line 224 is extended by operator 202, retractable line guidance system in accordance with an illustrative embodiment monitors the extended length of line 224, such as in a manner as described above. Retractable line guidance system compares the monitored length of line 224 with a pre-established start length. The pre-established start length may be selected to be shorter than a typical extended length of line 224 during normal operation of self-propelled machine 200 but sufficiently long such that operator 202 is at a safe distance from machine 200 before motor 220 is started. When the monitored length of line 224 is determined to meet or exceed the start length, the retractable line guidance system powers up 702 machine 200. Thus, in this case, extending line 224 from housing 200 by more than the selected start length is interpreted as a power-up instruction. Power-up 702 of machine 200 may include turning on retractable line guidance system fully, if it is not turned on already, and starting motor 220, such as by sending a start signal to a starter to start motor 200.

Upon power-up of 702 of machine 200, the retractable line guidance system is in neutral state 704. As discussed above, in neutral state 704, machine 200 is not in motion and movements of line 224 by operator 202 do not control the speed and direction of movement of machine 200 as they do during normal operation of machine 200. However, in neutral state 704, movements of line 224 by operator 200 are still detected and monitored. In this case, movements of line 224 by operator 200 may be used to provide control instructions to the retractable line guidance system.

In accordance with an illustrative embodiment, to engage the retractable line guidance system, that is, to transition 706 from neutral state 704 to engaged state 708, operator 200 moves line 224 vertically and horizontally in defined pattern 710. In this example, pattern 710 includes moving line 224 vertically upward, as indicated by arrow 712, followed by moving line 224 back-and-forth diagonally in a pattern as indicated by arrows 714. The portion 714 of pattern 710 used to transition 706 from neutral state 704 to engaged state 708 may be considered by some to represent a stylized version of the capital letter "E", for "engage". Any other line movement pattern may be used to present a control instruction for transition 706 from neutral state 704 to engaged state 708. As discussed above, when in engaged state 708, the retractable line guidance system is engaged for controlling movement of self-propelled machine 200, such that movements of line 224 by operator 202 are used to control the direction and speed of movement of machine 200.

In accordance with an illustrative embodiment, the selected length and/or selected angle of line 224 may be established by operator 102 as the current length and horizontal angle of line 224 at the time line 224 is moved in pattern 710 to enter engaged state 708. Alternatively, the retractable line guidance system may monitor a duration in which line 224 is held in a fixed position by operator 202 upon entering neutral state 704. If line 224 is held in a fixed position for longer than a selected hold duration threshold upon entering neutral state 704, retractable line guidance system may assume that the current extended length and selected angle of line 224 corresponds to the desired selected length and selected angle, and the selected length and selected angle may then be set to the current monitored extended length and horizontal angle of line 224.

Operator 202 may return the retractable line guidance system to neutral state 704 from engaged state 708 at any time by moving line 224 in defined pattern 716. Thus, in response to movement of line 224 in defined pattern 716, the retractable line guidance system transitions 718 from engaged state 708 to neutral state 704. In this example, pattern 716 includes moving line 224 vertically upward, as indicated by arrow 720, followed by moving line 224 diagonally downward and then vertically upward, as indicated by arrows 722, thereby moving the distal end of line 224 in a pattern representing the capital letter "N". Of course, any other pattern may be used to present a control instruction for transition 718 from engaged state 708 to neutral state 704.

From neutral state 704, machine 200 may be shut down by operator 200 by releasing line 224. Upon releasing line 224, line 224 is automatically retracted into housing 226 by operation of the tensioning mechanism described earlier. Retractable line guidance system may detect the release of line 224 from the resulting rapid and significant shortening of the extended length of line 224 as it is retracted into housing 226. In response to release of line 224, machine 200 may be powered down 724 by turning off motor 220 and turning off the retractable line guidance system or returning the retractable line guidance system to a state of reduced activity and energy consumption, as described above.

In accordance with an illustrative embodiment, as described above, by providing for the detection and monitoring of the movement of line 224 in both horizontal and vertical planes, an operator 200 may provide control instructions to a retractable line guidance system by moving line 224 in defined patterns or "air writing" using line 224. Control patterns 710 and 716 are examples of control instructions that may be provided to the guidance system using such "air writing", but any other desired patterns may be employed to provide any other desired control instructions to the guidance system.

To provide for guidance system control instruction using "air writing" it may be necessary to distinguish between line movements that are intended by operator 202 to indicated instructions to the guidance system and line movements that are intended by operator 202 to control the direction and speed of movement of self-propelled machine 200. This is particularly the case for instructions that are to be provided by "air writing" using line movements while the guidance system is in engaged state 708, because while in engaged state 708 a retractable line guidance system in accordance with an illustrative embodiment is actively controlling the direction and speed of movement of machine 200 in response to movements of line 224 by operator 202.

To distinguish "air writing" instructions from other control line movements, such instructions may begin with a quick or sudden line movement in a certain direction that brings the retractable line guidance system to attention, indicating that the line movements to follow are to be interpreted as an "air writing" instruction, and not as ordinary guidance controls. For example, sudden upward line movements 712 and 720 may indicate the beginning of line movement patterns 710 and 716 described previously, so that the following line movements 714 and 722 are not interpreted as guidance controls. The "attention" line movements indicating initiation of "air writing" instructions may be defined as any rate of change in the extended length and/or angle of line 224 that exceeds certain thresholds. Preferably, the thresholds are only considered in response to relatively large movements of the distal end of line 224, such as by 12 inches or more. Smaller movements of line 224 are ignored or are interpreted in the normal manner for guidance control. Thus, only large and quick movements of line 224 will be interpreted as such "attention" movements. Such movements are not likely to be used by an operator to control the speed and movement of self-propelled machine 200 under most normal operating conditions.

Figure 8:
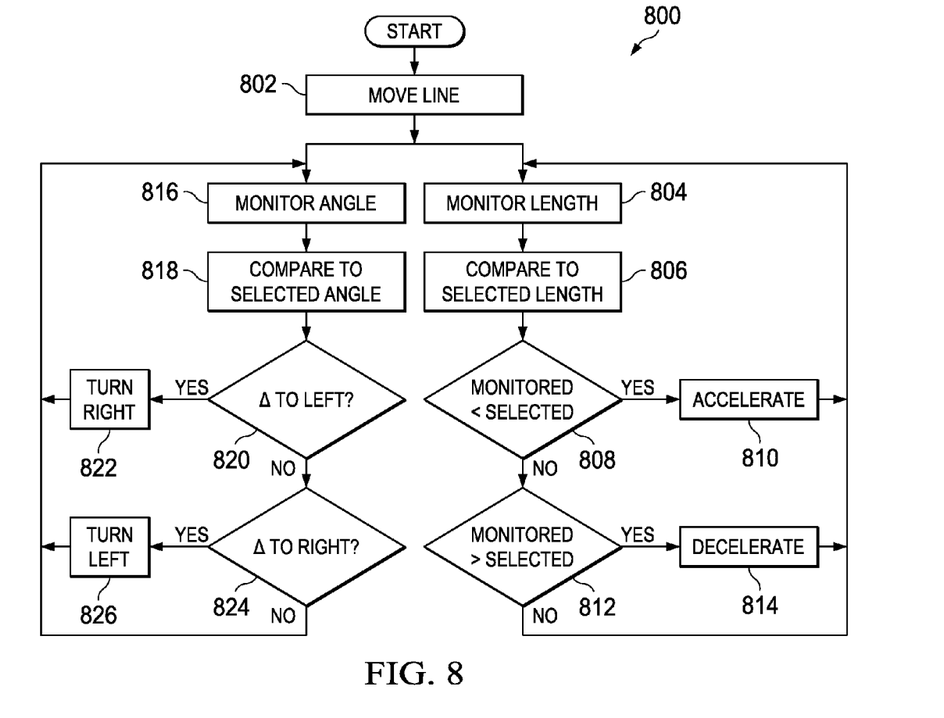
FIG. 8 is a flowchart of an operation method for a self-propelled machine using retractable line guidance in accordance with an illustrative embodiment.

Operating procedure 800 for guiding a self-propelled machine using retractable line guidance in accordance with an illustrative embodiment is presented in the flowchart diagram of FIG. 8. In this example, process 800 is an example of operation step 504 in FIG. 5. Process 800 may be used whenever a retractable line guidance system in accordance with an illustrative embodiment is in engaged state 616 or 708, described previously. Process 800 will be described with reference also to FIG. 2 and FIG. 3.

During operation of self-propelled machine 200 operator 202 moves line 224 to alter the movement speed and direction of movement of machine 200 (step 802). For example, step 802 may include pulling on line 224 to increase the extended length of line 224, allowing line 224 to be retracted into housing 226, and/or moving line 224 to the left 300 or right 306 in the horizontal plane.

The extended length of line 224 is monitored (step 804), such as in a manner as described above. The extended length of line 224 is compared to the selected length (step 806). When the monitored length is less than the selected length (step 808), self-propelled machine 200 is controlled to accelerate movement of the machine in forward direction 234 (step 810). For example, step 810 may include increasing forward motion speed or reducing reverse motion speed by a selected amount or step, up to a maximum forward motion speed. When the monitored length is greater than the selected length (step 812), self-propelled machine 200 is controlled to decelerate movement of the machine in the forward direction (step 814). For example, step 814 may include decreasing forward motion speed or increasing reverse motion speed by a selected amount or step, up to a maximum reverse motion speed or stop, depending upon the speed control available for a particular machine 200.

The angle of line 224 in the horizontal plane is monitored (step 816), such as in a manner as described above. The monitored angle of line 224 is compared to the selected angle (step 818). When the monitored angle is displaced to the left 300 of the selected angle (step 820), self-propelled machine 200 is controlled to turn in the direction as described above (step 822). For example, step 822 may include turning a wheel for guiding the direction of machine 200 to the right 302. When the monitored angle is displaced to the right 306 of the selected angle (step 824), self-propelled machine 200 is controlled to turn in the direction as described above (step 826). For example, step 826 may include turning a wheel for guiding the direction of machine 200 to the left 304. Note that the magnitude or degree of turn implemented in steps 822 and 826 may be proportional to the degree or magnitude of difference between the monitored angle of line 224 and the selected angle as determined in step 818.

Speed control functions implemented by the series of steps 804-814 and direction control functions implemented by the series of steps 816-826 preferably are performed simultaneously, to provide simultaneous speed and direction control using retractable line guidance in accordance with an illustrative embodiment. Speed control functions implemented by the series of steps 804-814 and direction control functions implemented by the series of steps 816-826 may be performed as continuous processes or periodically at a recurrence rate that is sufficiently rapid so as not to impact adversely guidance system responsiveness to movements of line 224 by operator 202. Furthermore, speed control functions implemented by the series of steps 804-814 and direction control functions implemented by the series of steps 816-826 may employ hysteresis, thresholds, or other concepts at appropriate points in the processes to prevent over-responsiveness of the retractable line guidance system to incidental or smaller movements of line 224 that operator 202 may not intend to result in a change in the movement speed or direction of movement of self-propelled machine 200.

Figure 9:
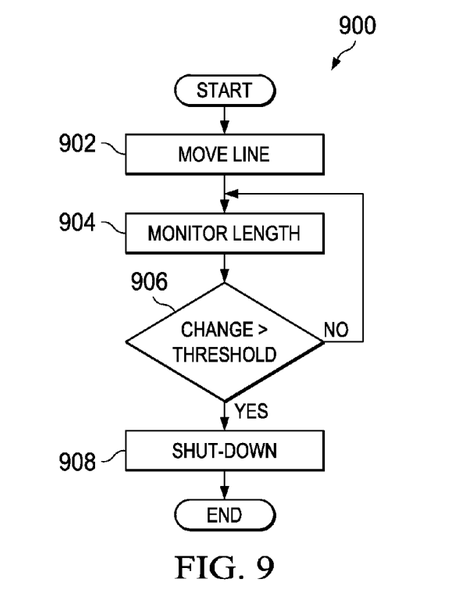
FIG. 9 is a flowchart of an emergency shut-down method for a self-propelled machine using retractable line guidance in accordance with an illustrative embodiment.

Emergency shut-down procedure 900 for a self-propelled machine using retractable line guidance in accordance with an illustrative embodiment is presented in the flow chart diagram of FIG. 9. Process 900 will be described with reference also to FIG. 2 and FIG. 3. Process 900 may operate concurrently with process 800 of FIG. 8 and some steps of the two processes may overlap.

During operation of self-propelled machine 200, operator 202 will control the movement of line 224 or may lose control of the movement of line 224 (step 902). For example, step 902 may include operator 202 pulling back quickly or jerking line 224. Step 902 also may include movement that is imparted to line 224 by a tensioning mechanism that causes line 224 to be drawn quickly into housing 226 when operator loses control of line 224, such as by dropping it. In accordance with an illustrative embodiment, both described occurrences may indicate an emergency shut-down condition and that operation of self-propelled machine 200 should stop and motor 220 shut down. The former case represents a controlled emergency shut-down, that is, a shut-down under operator control that can be accomplished quickly with little more than reflexive action by operator 202. The latter case represents an automatic emergency shut-down, where machine 200 is shut down automatically in response to operator 202 losing control of machine 200.

The extended length of line 224 is monitored (step 904), such as in a manner as describe above. It is determined whether the monitored length of line 224 changes at a rate which exceeds an emergency shut-down threshold rate (step 906). As long as the rate of change of monitored line length does not exceed the emergency shut-down threshold, normal operation can continue. When the rate of change of monitored line length exceeds the emergency shut-down threshold, operation of self-propelled machine 200 is shut-down automatically by the retractable line guidance system (step 908). For example, step 908 may include stopping any movement of machine 200 and/or stopping motor 220. Step 906 may employ the same or different line length rate of change thresholds to determine if shut-down is indicated when line 224 is being extended, to implement a controlled shut-down, and when line 224 is being retracted, to implement an emergency shut-down.

The flowcharts and block diagrams in the different depicted embodiments illustrate the architecture, functionality, and operation of some possible implementations of apparatus and methods in different advantageous embodiments. In this regard, each block in the flowcharts or block diagrams may represent a module, segment, function, and/or partition of an operation or step. In some alternative implementations, the function or functions noted in the block may occur out of the order noted in the figures. For example, in some cases, two blocks shown in succession may be executed substantially concurrently, or the blocks may sometimes be executed in the reverse order, depending on the functionality involved. Also, other blocks may be added in addition to the illustrated blocks in a flowchart or block diagram.

The description of different advantageous embodiments has been presented for purposes of illustration and explanation, and is not intended to exhaust or limit the embodiments to the forms disclosed. Many modifications and variations will be apparent to those of ordinary skill in the art. Further, different embodiments may provide different advantages as compared to other embodiments. The embodiments disclosed are chosen and described in order to best explain the principles of the invention, the practical application, and to enable others of ordinary skill in the art to understand the invention for various embodiments with various modifications as are suited to the particular use contemplated.

What is claimed is:

1. A self-propelled machine, comprising:
   a speed control mechanism configured to control a speed of movement of the self-propelled machine;
   a direction control mechanism configured to control a direction of movement of the self-propelled machine;
   a retractable and extendable line mounted on the self-propelled machine such that the line is under tension in a retraction direction when the line is extended from the self-propelled machine;
   a line extension monitoring device configured to monitor a length of extension of the line;
   a speed controller connected to the line extension monitoring device and to the speed control mechanism and configured to control the speed control mechanism to control the speed of movement of the self-propelled machine in response to the length of extension of the line to maintain the length of extension of the line at a selected length;
   a line angle monitoring device configured to monitor an angle of the line with respect to the self-propelled machine; and
   a direction controller connected to the line angle monitoring device and to the direction control mechanism and configured to control the direction control mechanism to control the direction of movement of the self-propelled machine in response to the angle of the line to maintain the angle of the line at a selected angle wherein the direction controller is configured to control the direction control mechanism to turn the self-propelled machine to the right in response to a displacement in the angle of the line to the left and to control the direction control mechanism to turn the self-propelled machine to the left in response to a displacement in the angle of the line to the right.

2. The self-propelled machine of claim 1, wherein the length of extension of the line and the angle of the line are controlled by an operator positioned on a side of the self-propelled machine opposite to a direction of forward movement of the self-propelled machine.

3. The self-propelled machine of claim 1 further comprising:
   a rotatable reel upon which the line is wound; and
   a tensioning mechanism coupled to the reel to maintain the line under tension.

4. The self-propelled machine of claim 3, wherein the line extension monitoring device includes a device configured to monitor a rotation of the reel.

5. The self-propelled machine of claim 3 further comprising an arm supporting the line and wherein the line angle monitoring device includes a device configured to monitor displacement of the arm by the line.

6. The self-propelled machine of claim 3 further comprising a line housing mounted on the self-propelled machine and containing the rotatable reel and tensioning mechanism.

7. The self-propelled machine of claim 1 further comprising a start-up controller coupled to a motor and to the line extension monitoring device and configured to start the motor in response to extension of the line from the self-propelled machine by more than a selected start length.

8. The self-propelled machine of claim 1 further comprising:
   a handle attached at a distal end of the line;
   at least one controller button on the handle and in communication with the speed controller and the direction controller; and
   wherein the speed controller and direction controller are engaged and disengaged in response to actuation of the at least one controller button.

9. The self-propelled machine of claim 1, wherein the speed controller and direction controller are engaged and disengaged in response to movement of the line in defined patterns.

10. The self-propelled machine of claim 1 further comprising a task payload mounted on the self-propelled machine, wherein the task payload is selected from the group of task payloads consisting of a mower blade, a cargo hold, a vacuuming device, a sweeper, a tiller, a plow, a snow removal device, and a spreader.

11. A method for guiding a self-propelled machine, comprising:
providing a retractable and extendable line mounted on the self-propelled machine such that the line is under tension in a retraction direction when the line is extended;
monitoring a length of extension of the line;
controlling a speed of movement of the self-propelled machine in response to the length of extension of the line to maintain the length of extension of the line at a selected length;
monitoring an angle of the line with respect to the self-propelled machine; and
controlling a direction of movement of the self-propelled machine in response to the angle of the line to maintain the angle of the line at a selected angle wherein controlling the direction of movement of the self-propelled machine includes turning the self-propelled machine to the right in response to a displacement in the angle of the line to the left and turning the self-propelled machine to the left in response to a displacement in the angle of the line to the right.

12. The method of claim 11, wherein the length of extension of the line and the angle of the line are controlled by an operator positioned on a side of the self-propelled machine opposite to a direction of forward movement of the self-propelled machine.

13. The method of claim 11, wherein controlling a speed of movement of the self-propelled machine includes:
accelerating movement of the self-propelled machine in a forward direction when the length of extension of the line is less than the selected length; and
decelerating movement of the self-propelled machine in the forward direction when the length of extension of the line is greater than the selected length.

14. The method of claim 11, wherein controlling the direction of movement of the self-propelled machine includes changing a direction of movement of the self-propelled machine at a variable rate relative to a degree of difference between the monitored angle of the line and the selected angle.

15. The method of claim 11, wherein monitoring a length of extension of the line includes monitoring a rotation of a reel around which the line is wound.

16. The method of claim 11, wherein monitoring an angle of the line includes monitoring a displacement of an arm upon which the line is supported.

17. The method of claim 11 further comprising starting a motor of the self-propelled machine in response to extension of the line by more than a selected start length.

18. The method of claim 11 further comprising providing a handle attached at a distal end of the line, providing a control button on the handle, and setting the selected length in response to activation of the control button.

19. The method of claim 11 further comprising engaging and disengaging the controlling steps in response to movement of the line in defined patterns.

20. An apparatus for guiding a self-propelled machine, comprising:
a retractable and extendable line;
a tensioning mechanism configured to maintain the line under tension in a retraction direction when the line is extended;
a line extension monitoring device configured to monitor a length of extension of the line;
a line angle monitoring device configured to monitor an angle of the line; and
a controller connected to the line extension monitoring device and to the line angle monitoring device and configured to generate speed control signals to control a speed of movement of the self-propelled machine in response to the length of extension of the line to maintain the length of extension of the line at a selected length and configured to generate direction control signals to control a direction of movement of the self-propelled machine in response to the angle of the line to maintain the angle of the line at a selected angle wherein the controller is configured to generate direction control signals to turn the self-propelled machine to the right in response to a displacement in the angle of the line to the left and to generate direction control signals to turn the self-propelled machine to the left in response to a displacement in the angle of the line to the right.

21. The apparatus of claim 20 further comprising a rotatable reel upon which the line is wound and wherein the tensioning mechanism is coupled to the reel to maintain the line under tension.

22. The apparatus of claim 21, wherein the line extension monitoring device includes a device configured to monitor a rotation of the reel.

23. The apparatus of claim 21 further comprising an arm supporting the line and wherein the line angle monitoring device includes a device configured to monitor displacement of the arm by the line.

24. The apparatus of claim 20, wherein the controller is configured further to generate a start signal to start a motor of the self-propelled machine in response to extension of the line by more than a selected start length.

25. The apparatus of claim 20 further comprising:
a handle attached at a distal end of the line;
a control button on the handle and in communication with the controller; and
wherein the controller is configured further to set the selected length in response to actuation of the control button.

26. The apparatus of claim 20, wherein the controller is configured further to engage and disengage generation of the speed control signals and of the direction control signals in response to movement of the line in defined patterns.

* * * * *